United States Patent
Harayama

(10) Patent No.: US 9,760,811 B2
(45) Date of Patent: Sep. 12, 2017

(54) PRINTING APPARATUS AND PRINTING METHOD

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/124,031

(22) PCT Filed: Mar. 6, 2015

(86) PCT No.: PCT/JP2015/056611
§ 371 (c)(1),
(2) Date: Sep. 7, 2016

(87) PCT Pub. No.: WO2015/133598
PCT Pub. Date: Sep. 11, 2015

(65) Prior Publication Data
US 2017/0017864 A1    Jan. 19, 2017

(30) Foreign Application Priority Data

Mar. 7, 2014 (JP) ................. 2014-045619

(51) Int. Cl.
*H04N 1/46* (2006.01)
*H04N 1/60* (2006.01)
(Continued)

(52) U.S. Cl.
CPC ........ *G06K 15/107* (2013.01); *B41J 2/04501* (2013.01); *H04N 1/40025* (2013.01);
(Continued)

(58) Field of Classification Search
None
See application file for complete search history.

(56) References Cited

U.S. PATENT DOCUMENTS 6,120,461 A * 9/2000 Smyth .................... A61B 3/113
348/E13.041
6,206,502 B1 * 3/2001 Kato ...................... B41J 2/2132
347/41

(Continued)

FOREIGN PATENT DOCUMENTS

JP    2011224883    11/2011

OTHER PUBLICATIONS

"Search Report of Europe Counterpart Application", issued on Feb. 16, 2017, p. 1-p. 7.

(Continued)

*Primary Examiner* — Madelein Nguyen
(74) *Attorney, Agent, or Firm* — Jiang Chyun Intellectual Property Office

(57) ABSTRACT

A printing apparatus for performing printing in an inkjet mode includes an inkjet head, and a controller. The controller controls the inkjet head such that the inkjet head performs printing on a medium in a multi-pass mode. In each printing pass performed on each position of the medium, the controller controls the inkjet head such that the inkjet head ejects ink drops onto pixels designated by a mask data item. In a case where the spatial frequencies of the arrangement of ink dots formed on the medium during a first printing pass of the printing passes are referred to as first frequencies, and the spatial frequencies of the arrangement of ink dots formed on the medium during a second printing pass later than the first printing pass are referred to as second frequencies, the first frequencies are frequencies lower than the second frequencies.

10 Claims, 9 Drawing Sheets

(51) Int. Cl.
*G06K 15/10* (2006.01)
*B41J 2/045* (2006.01)
*H04N 1/40* (2006.01)

(52) U.S. Cl.
CPC ............... *G06K 2215/0094* (2013.01); *G06K 2215/101* (2013.01)

(56) References Cited

U.S. PATENT DOCUMENTS

| | | | | |
|---|---|---|---|---|
| 6,601,939 | B2* | 8/2003 | Fujita | G06K 15/107 347/15 |
| 7,374,280 | B2* | 5/2008 | Kusunoki | B41J 11/002 347/102 |
| 7,510,277 | B2* | 3/2009 | Konno | B41J 2/155 347/101 |
| 8,668,323 | B2* | 3/2014 | Onishi | B41J 3/543 347/102 |
| 8,814,343 | B2* | 8/2014 | Onishi | B41J 11/002 347/102 |
| 2002/0054305 | A1* | 5/2002 | Ogasahara | B41J 2/2132 358/1.8 |
| 2003/0052941 | A1* | 3/2003 | Sato | G06K 15/107 347/41 |
| 2005/0219295 | A1* | 10/2005 | Yamazaki | H04N 1/40087 347/15 |
| 2005/0285896 | A1* | 12/2005 | Hori | B41J 2/145 347/40 |
| 2008/0316554 | A1* | 12/2008 | Yanai | G06K 15/107 358/534 |
| 2009/0085999 | A1* | 4/2009 | Furukawa | B05C 1/0813 347/102 |
| 2010/0141972 | A1* | 6/2010 | Yanai | H04N 1/1911 358/1.9 |
| 2010/0321737 | A1* | 12/2010 | Nakatani | G06K 15/107 358/3.03 |
| 2010/0328384 | A1* | 12/2010 | Kyoshima | B41J 2/2132 347/12 |
| 2011/0037794 | A1 | 2/2011 | Kutsuna | |
| 2011/0043838 | A1* | 2/2011 | Yamada | B41J 2/2132 358/1.9 |
| 2011/0075174 | A1* | 3/2011 | Kajihara | B41J 2/2132 358/1.9 |
| 2011/0080615 | A1* | 4/2011 | Ono | H04N 1/1911 358/3.23 |
| 2011/0134177 | A1* | 6/2011 | Konno | B41J 2/2125 347/14 |
| 2011/0298850 | A1 | 12/2011 | Ochiai | |
| 2016/0121620 | A1* | 5/2016 | Yanai | B41J 2/205 428/195.1 |
| 2016/0214380 | A1* | 7/2016 | Ohnishi | B41J 2/2132 |
| 2016/0332459 | A1* | 11/2016 | Ohnishi | B41J 2/2132 |

OTHER PUBLICATIONS

"International Search Report (Form PCT/ISA/210) of PCT/JP2015/056611", mailed on May 26, 2015, with English translation thereof, pp. 1-2.

* cited by examiner

PRINTING APPARATUS AND PRINTING METHOD

CROSS-REFERENCE TO RELATED APPLICATION

This application is a 371 application of the International PCT application serial no. PCT/JP2015/056611, filed on Mar. 6, 2015, which claims the priority benefits of Japan Patent Application No. 2014-045619, filed on Mar. 7, 2014. The entirety of each of the above-mentioned patent applications is hereby incorporated by reference herein and made a part of this specification.

TECHNICAL FIELD

The disclosure relates to a printing apparatus and a printing method.

BACKGROUND ART

Inkjet printers for performing printing in an inkjet scheme according to the related art are being widely used. Inkjet printers perform printing by ejecting ink drops from inkjet heads toward media. Also, as a method of performing printing by an inkjet printer, a multi-pass mode (multi-pass recording) is widely being used (see PTL 1 for instance). In this case, the multi-pass mode is, for example, a mode for performing a plurality of main scan operations corresponding to a plurality of printing passes on each position of a medium.

CITATION LIST

Patent Literature

PTL 1: JP-A-2011-224883

SUMMARY OF DISCLOSURE

Technical Problem

In an inkjet printer, in a case of performing printing the multi-pass mode, during each main scan operation corresponding to one printing pass, while an inkjet head passes over an area of a medium, the inkjet head ejects ink drops onto some pixels of the area. Also, in this case, pixels for which ink drops should be ejected during each main scan operation are determined, for example, on the basis of a preset mask data item (a mask).

Therefore, in the case of performing printing in the multi-pass mode, the configuration of the mask data item may influence the quality of printing. More specifically, for example, it can be considered to use, as the mask data item, a mask data item (a high-frequency mask) having high spatial frequencies with respect to an arrangement of pixels for which ink drops should be ejected during each main scan operation. In a case of using such a high-frequency mask, for example, it is possible to perform printing such that the granularity of image quality is low. Also, it is possible to suppress generation of pattern stripes which are repetitive patterns attributable to the pattern of a mask data item.

However, in the inkjet printer, on the basis of the principle of printing, deviation in the landing positions of ink drops on a medium may occur. Also, in a case of using a high-frequency mask, the tolerance range for landing positions is narrow, and in a case where landing positions are deviated, there is a problem that alternate stripes (optical stripes) and mask stripes are likely to be generated. In this case, the alternate stripes are stripes which are generated since the states of the print results of areas on a medium having the width of one printing pass alternately change. Also, the width of one printing pass means the width of a printing pass in a sub scan direction perpendicular to a main scan direction in which main scan operations are performed. Also, the mask stripes are specific stripes which are caused, for example, by the peak of a specific spatial-frequency peak generated on the basis of the relation between the pattern of the mask data item and deviation in landing positions.

Also, for example, it can be considered to use, as the mask data item, a mask data item (a low-frequency mask) having low spatial frequencies with respect to an arrangement of pixels for which ink drops should be ejected during each main scan operation. In a case of using such a low-frequency mask, the tolerance range for landing positions of the ink drops is wide, and even if deviation in landing positions occurs, stripes such as mask stripes are unlikely to be generated. However, in this case, for example, there is a problem that pattern stripes are more likely to be generated, and the granularity of image quality is higher, as compared to a case of using a high-frequency mask.

Also, it is considered to use, as the mask data item, a mask data item (a white noise mask) in which spatial frequencies are widely distributed over the entire frequency band, without being one-sided on the high frequency side or the low frequency side. In this configuration, not only with respect to its advantages but also with respect to its disadvantages, it is possible to obtain intermediate features between a high-frequency mask and a low-frequency mask. However, in this case, it is impossible to entirely obtain the advantages of a high-frequency mask and a low-frequency mask, and the problems of those masks still remain.

For this reason, with respect to mask data items for the multi-pass mode, a more appropriate mask data configuration has been desired. Therefore the disclosure provides a printing apparatus and a printing method capable of solving the above described problems.

Solution to Problem

In an inkjet printer, in a case of performing printing in a multi-pass mode, generally, on the basis of a multi-grayscale data item (multi-grayscale mask pattern data item) which is a data item represented in preset multiple grayscales, a mask data item for each printing pass is generated. In this case, as the multi-grayscale mask pattern data item, for example, a data item representing the pixel values of a plurality of pixels arranged in a main scan direction and a sub scan direction, in multiple grayscales. Also, a mask data item for each printing pass is generated, for example, by binarizing the multi-grayscale mask pattern data item with a preset threshold. Also, as a result, the spatial frequency characteristic of the mask data item for each printing pass becomes a characteristic according to the spatial frequency characteristic of the multi-grayscale mask pattern data item. More specifically, for example, in a case of using, as the multi-grayscale mask pattern data item, a data item having a spatial frequency characteristic positioned on the high frequency side, generally, the spatial frequency characteristic of the mask data item for each printing pass is also positioned on the high frequency side. Also, for example, in a case of using, as the multi-grayscale mask pattern data item, a data item having a spatial frequency characteristic positioned on the low frequency side, generally, the spatial frequency characteristic of the mask data item for each printing pass is also positioned on the low frequency side.

With respect to this, by earnest researches, the inventor of this application thought of, for example, a method of making the spatial frequency characteristics of mask data items of some printing passes be positioned on the low frequency side and making the spatial frequency characteristics of mask data items of other printing passes be positioned on the high frequency side, instead of making the spatial frequency characteristics of mask data items of all printing passes identical or similar to one another. Also, by more earnest researches, the inventor of this application found that, if the printing pass using the mask data item of the low frequency side is first performed, and then the printing passes using the mask data item of the high frequency side is performed, for example, it is possible to obtain advantages similar to those in a case of separately using the high-frequency mask and the low-frequency mask, and it is possible to appropriately suppress their problems. Accordingly, the disclosure has the following configurations.

An printing apparatus according to the disclosure is a printing apparatus for performing printing on a medium in an inkjet mode, and includes: an inkjet head configured to eject ink drops onto the medium by performing main scan operations of ejecting ink drops while moving in a predetermined main scan direction; a main scan driver configured to drive the inkjet head to perform the main scan operations; a sub scan driver configured to relatively move the inkjet head with respect to the medium in a sub scan direction perpendicular to the main scan direction; and a controller configured to control the operations of the inkjet head, the main scan driver, and the sub scan driver, thereby controlling the operation of performing printing on the medium.

The controller controls the inkjet head such that the inkjet head performs printing on the medium in a multi-pass mode for performing a plurality of main scanning operations corresponding to a plurality of printing passes on each position of the medium. In each of the plurality of printing passes which is performed on each position of the medium, the controller uses a mask data item which is a data item for designating pixels to be subjected to ink drop ejection, and controls the inkjet head such that the inkjet head ejects ink drops onto pixels designated by the mask data item. The plurality of printing passes which is performed on each position of the medium includes a first printing pass, and a second printing pass which is performed later than the first printing pass. In a case where the spatial frequencies of the arrangement of ink dots which are formed on the medium by a main scan operation corresponding to the first printing pass are referred to as first frequencies, and the spatial frequencies of the arrangement of ink dots which are formed on the medium by a main scan operation corresponding to the second printing pass are referred to as second frequencies, the first frequencies are frequencies lower than the second frequencies.

In this configuration, for example, with respect to each position of the medium, a main scan operation corresponding to the first printing pass using the mask data item having lower spatial frequencies is first performed, and then a main scan operation corresponding to the second printing pass using the mask data item having higher spatial frequencies is performed. In this case, for example by performing printing corresponding to the first printing pass, it is possible to implement a configuration in which the characteristic of the low-frequency mask is utilized, and the tolerance for deviation in the landing positions of ink drops is great, and even if deviation in the landing positions occur, it is difficult for stripes such as alternate stripes and mask stripes to be generated. Also, by performing printing corresponding to the second printing pass, it is possible to appropriately perform printing by the configuration in which it is difficult for pattern stripes to be generated, such that granularity is less.

Therefore, according to this configuration, for example, it is possible to perform printing utilizing the advantages of the high-frequency mask and the low-frequency mask. Also, as a result, with respect to the mask data items which are used in the multi-pass mode, for example, it is possible to implement a more appropriate mask data item configuration capable of higher quality printing. Also, as a result, for example, in the multi-pass mode, it is possible to more appropriately perform high-quality printing.

Also, each position of the medium means, for example, each position of a print area of the medium on which printing is performed. Also, the spatial frequencies of the arrangement of ink dots formed on the medium by a main scan operation corresponding to each printing pass mean the spatial frequency characteristic representing the distribution of inter-dot distances which are the distances between neighboring dots in the arrangement of ink dots formed on the medium during the corresponding printing pass. Also, in this case, a state where the first frequencies are lower than the second frequencies means a state where the spatial frequency characteristic corresponding to the first printing pass has a low-frequency-side characteristic than the spatial frequency characteristic corresponding to the second printing pass. Also, for example, in a case of generating mask data items for the first printing pass and the second printing pass by binarizing one common multi-grayscale mask pattern data item with different thresholds, respectively, a state where the first frequencies are lower than the second frequencies means, for example, a state where the threshold for generating the mask data item for the first printing pass is lower than the threshold for generating the mask data item for the second printing pass.

Also, in a case of performing printing in the multi-pass mode, in the printing passes of the first half, since ink dots having been already formed on the medium are few, a lot of ink drops which are ejected during the main scan operations corresponding to those printing passes land directly on the medium in a state where there are no other ink dots around their landing positions. For this reason, in this case, it can be considered that, if unexpected contact between ink dots occurs due to deviation in the landing positions, the quality of printing is likely to be influenced by the dot contact. Therefore, it is considered that, in the printing passes of the first half, it is preferable to use a mask data item capable of suppressing generation of stripes even if deviation in the landing positions occurs.

Meanwhile, in the printing passes of the second half, since ink dots having been already formed on the medium are many, it can be considered that, even if deviation in the landing positions occurs, the quality of printing is influenced less as compared to the printing passes of the first half. However, in the printing passes of the second half, ink dots are formed at portions close to the surface of the printed side. Therefore, it can be considered that those dots have a great influence on the quality of printing, with respect to granularity and stripes such as pattern stripes. For this reason, it can be considered that, in the printing passes of the second half, it is preferable to use a mask data item capable of reducing granularity and suppressing generation of pattern stripes and the like.

With respect to this, according to the above described configuration, for example, as the mask data item for the first printing pass which is first performed, it is possible to appropriately use a mask data item capable of suppressing generation of stripes even if deviation in the landing positions occurs. Also, as the mask data item for the second printing pass which is subsequently performed, it is possible to appropriately use a mask data item capable of reducing granularity and suppressing generation of pattern stripes and the like. Also, as a result, as described above, with respect to the mask data items which are used in the multi-pass mode, it is possible to implement a more appropriate mask data item configuration capable of higher quality printing.

The first printing pass is a printing pass corresponding to a main scan operation which is first performed on each position of the medium, and the first frequency is a frequency lower than the spatial frequency of the arrangement of ink dots which are formed on the medium by a main scan operation corresponding to any one of the second and subsequent printing passes.

By more earnest researches, the inventor of this application found that, in a case of performing printing in the multi-pass mode, if a mask data item having a low spatial frequency is used for a primary printing pass, it is possible to appropriately suppress the influence of deviation in the landing positions. According to this configuration, for example, in the multi-pass mode, it is possible to more appropriately perform high-quality printing.

The controller uses data items obtained by converting a multi-grayscale mask pattern data item which is one common data item, as the mask data items for the first printing pass and the second printing pass, respectively, and the multi-grayscale mask pattern data item is a multi-grayscale data item representing the pixel values of a plurality of pixels arranged in the main scan direction and the sub scan direction, in multiple grayscales, and the mask data item for the first printing pass is a data item obtained by binarizing the multi-grayscale mask pattern data item with a preset first threshold, and the mask data item for the second printing pass is a data item obtained by binarizing the multi-grayscale mask pattern data item with a second threshold corresponding to a concentration higher than that of the first threshold.

In this configuration, for example, with respect to the first printing pass and the second printing pass, it is possible to easily and appropriately generate corresponding mask data items. Also, for example, with respect to the first frequencies corresponding to the first printing pass, it is possible to set frequencies appropriately lower than the second frequencies corresponding to the second printing pass. Therefore, according to this configuration, for example, in the multi-pass mode, it is possible to more appropriately perform high-quality printing.

Also, as the mask data item which is used for the first printing pass, for example, a data item obtained by binarizing the multi-grayscale mask pattern data item with a threshold lower than the concentration of 30% can be suitably used. Also, as the mask data item which is used for the second printing pass, for example, a data item obtained by binarizing the multi-grayscale mask pattern data item with a threshold higher than the concentration of 30% can be suitably used. In this configuration, for example, it is possible to more easily and appropriately generate the mask data items corresponding to the first printing pass and the second printing pass, respectively. Also, for example, in a case of including other printing passes in addition to the first printing pass and the second printing pass, the controller may use data items obtained by binarizing the multi-grayscale mask pattern data item with thresholds preset for the individual printing passes, as the mask data items for the plurality of printing passes, respectively.

By the main scan operation of the first printing pass, the inkjet head forms ink dots on the medium in a pattern including a plurality of colonies and a plurality of void areas, each colony being an area having a plurality of ink dots densely formed, and each void area separating a plurality of colonies and having ink dots formed at least at a density lower than those of the colonies. The plurality of colonies is arranged with the void areas interposed therebetween. In a case of calculating a spatial frequency characteristic representing the distribution of inter-dot distances which are the distances between neighboring dots in the arrangement of ink dots formed on the medium by the main scan operation during the first printing pass, in the spatial frequency characteristic, 60% or greater of all inter-dot distances correspond to spatial frequencies higher than the peak frequency of a visual sensitivity function, and the spatial frequency characteristic has at least one peak in a frequency band lower than the peak frequency of the visual sensitivity function.

In this case, the spatial frequencies corresponding to the inter-dot distances mean spatial frequencies at which the inter-dot distances are equal to corresponding wavelengths. Also, the peak frequency of the visual sensitivity function is, for example, the peak frequency of the visual sensitivity function at the printing resolution.

By more earnest researches, the inventor of this application found that, it is preferable to use a mask data item for forming ink dots in the above described arrangement, as the mask data item for the first printing pass. According to this configuration, for example, it is possible to more appropriately implement a mask data configuration capable of higher quality printing.

Also, in the above described configuration, with respect to the feature of the colonies, a case where a plurality of ink dots is densely formed means, for example, a case where, ink dots of ink for forming colonies are densely formed such that the spatial frequencies corresponding to the inter-dot distances become spatial frequencies higher than the peak frequency of the visual sensitivity function. Also, with respect to the spatial frequency characteristic which is calculated with respect to the first printing pass, it is preferable that 70% or greater of all inter-dot distances should be inter-dot distances corresponding to spatial frequencies higher than the peak frequency of the visual sensitivity function. According to this configuration, for example, it is possible to more appropriately concentrate ink dots in the colonies.

Also, in a case of using the mask data item having the above described configuration as the mask data item for the first printing pass, for example, it becomes easier to generate various mask data items having different spatial frequency characteristics from the common multi-grayscale mask pattern data item. Also, as a result, it is possible to more easily and appropriately generate the mask data items for the first printing pass and the second printing pass. Therefore, according to this configuration, even in this point, for example, it is possible to more appropriately implement a mask data configuration capable of higher-quality printing.

In the arrangement of ink dots which are formed on the medium by the main scan operation of the first printing pass, the ink dots in each colony are arranged such that spatial frequencies corresponding to the inter-dot distances are higher than the peak frequency of the visual sensitivity function, and the lengths of each void area in the main scan direction and the sub scan direction are longer than a wavelength corresponding to the peak frequency of the visual sensitivity function. According to this configuration, for example, it is possible to appropriately set the spatial frequencies corresponding to the first printing pass, on the low frequency side. Also, in this case, for example, it is preferable that the lengths of each colony in the main scan direction and the sub scan direction should be longer than the wavelength corresponding to the peak frequency of the visual sensitivity function.

By the main scan operation of the first printing pass, the inkjet head forms a plurality of colony rows on the medium, each colony including a plurality of colonies arranged side by side in the main scan direction, and each colony of each colony row is adjacent to a void area of a neighboring colony row of the sub scan direction, in the sub scan direction, and each void area of each colony row is adjacent to a colony of a neighboring colony row of the sub scan direction, in the sub scan direction. According to this configuration, for example, it is possible to more appropriately obtain the effect of the case of setting the spatial frequency characteristic corresponding to the first printing pass, on the low frequency side.

Also, in this configuration, the arrangement of the colonies and the void areas is, for example, a checkered arrangement. In this case, the checkered arrangement is, for example, a configuration in which, on both sides of each colony in a predetermined first direction, and on both sides of each colony in a second direction perpendicular to the first direction, void areas are disposed. Also, in this case, the first direction may be, for example, a direction intersecting with the main scan direction and the sub scan direction at 45 degrees. Also, it can be said that this configuration is a configuration in which on both sides of each low-concentration area in the first direction and on both sides of each low-concentration area in the second direction, colonies are disposed.

In a case of representing a spatial frequency characteristic representing the inter-dot distance distribution of the arrangement of ink dots formed on the medium by the main scan operation of the first printing pass, by a continuous curve, the waveform of the curve representing the spatial frequency characteristic is a waveform having a high-frequency-side peak which is a peak existing in a frequency band higher than the peak frequency of the visual sensitivity function, and a low-frequency-side peak which is a peak existing in a frequency band lower than the peak frequency of the visual sensitivity function, and in the waveform, the peak width of the low-frequency peak is narrower than the peak width of the high-frequency peak. According to this configuration, for example, it is possible to more appropriately obtain the effect of the case of setting the spatial frequency characteristic corresponding to the first printing pass, on the low frequency side.

The printing apparatus performs printing in a multi-pass mode at a resolution of 600 dpi or greater. According to this configuration, for example, it is possible to appropriately perform printing at a high resolution.

In a case where the resolution of printing is high, since the distances between ink dots which are formed on the medium are short, particularly, the influence of deviation in the landing positions of ink drops is likely to occur. In contrast with this, in the above described configuration, for example, by setting the spatial frequency characteristic corresponding to the first printing on the low frequency side, it is possible to appropriately suppress the influence of deviation in the landing positions and the like. Therefore, according to this configuration, for example, in a case where the resolution of printing is high, it is possible to more appropriately perform printing.

A printing method according to the disclosure is a printing method of performing printing in an inkjet mode on a medium, and uses an inkjet head configured to eject ink drops onto the medium by performing main scan operations of ejecting ink drops while moving in a predetermined main scan direction, a main scan driver configured to drive the inkjet head to perform the main scan operations, and a sub scan driver configured to relatively move the inkjet head with respect to the medium in a sub scan direction perpendicular to the main scan direction, and controls the operations of the inkjet head, the main scan driver, and the sub scan driver, thereby controlling the operation of performing printing on the medium. In this control, the method controls the inkjet head such that the inkjet head performs printing on the medium in a multi-pass mode for performing a plurality of main scanning operations corresponding to a plurality of printing passes on each position of the medium. In each of the plurality of printing passes which is performed on each position of the medium, the method uses a mask data item which is a data item for designating pixels to be subjected to ink drop ejection, and controls the inkjet head such that the inkjet head ejects ink drops onto pixels designated by the mask data item. The plurality of printing passes which is performed on each position of the medium includes a first printing pass, and a second printing pass which is performed later than the first printing pass. In a case where the spatial frequencies of the arrangement of ink dots which are formed on the medium by a main scan operation corresponding to the first printing pass are referred to as first frequencies, and the spatial frequencies of the arrangement of ink dots which are formed on the medium by a main scan operation corresponding to the second printing pass are referred to as second frequencies, the first frequencies are frequencies lower than the second frequencies. According to this configuration, for example, it is possible to achieve the same effects as those of the first configuration.

Advantageous Effects of Disclosure

According to the disclosure, with respect to mask data items for the multi-pass mode, it is possible to a more appropriate mask data configuration.

DESCRIPTION OF EMBODIMENTS

Hereinafter, an embodiment according to the disclosure will be described with reference to the accompanying drawings.

Figure 1A:
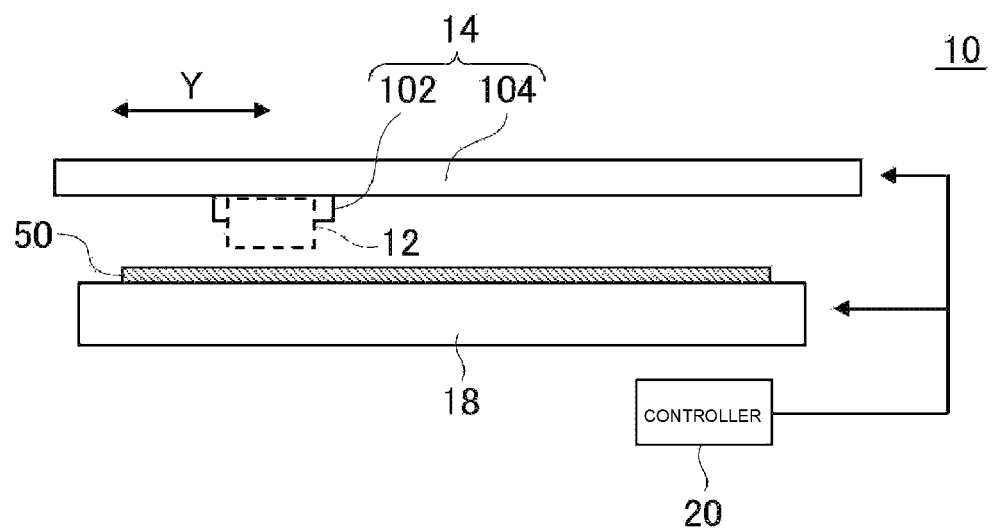
FIGS. 1A and 1B are views illustrating an example of a main configuration of a printing apparatus according to an embodiment.
Figure 1B:
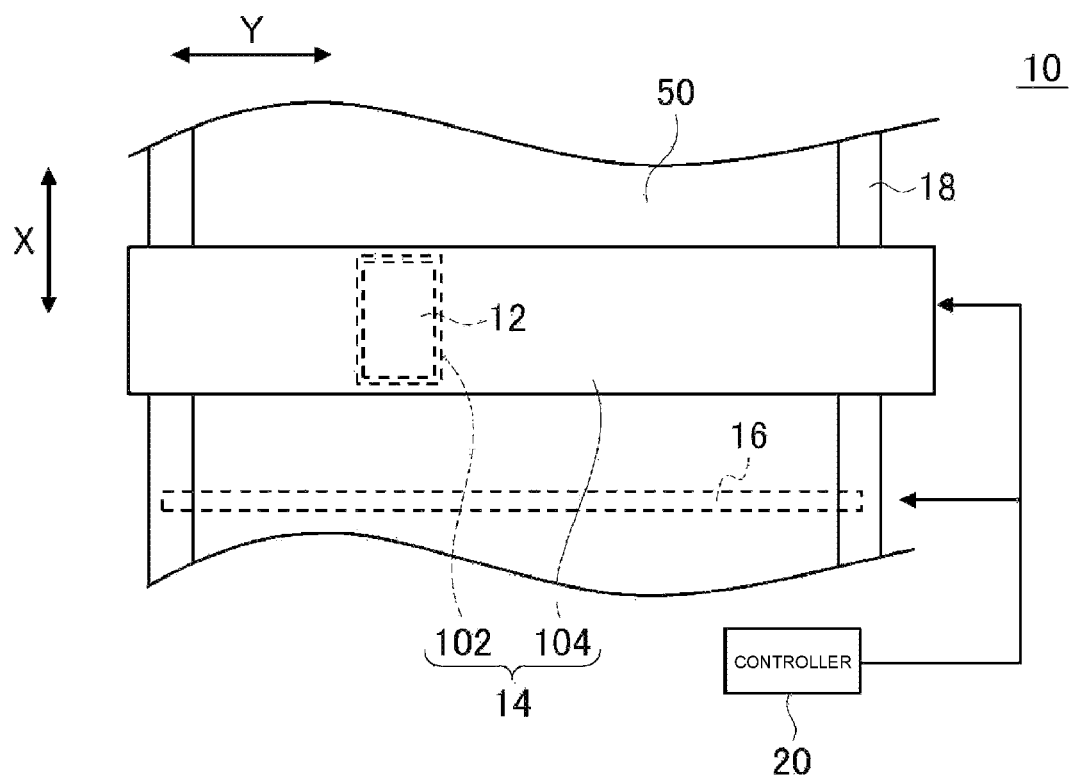

FIGS. 1A and 1B are views illustrating an example of a main configuration of a printing apparatus 10 according to the embodiment, and FIG. 1A is a front view, and FIG. 1B is a top view.

Figure 2A:
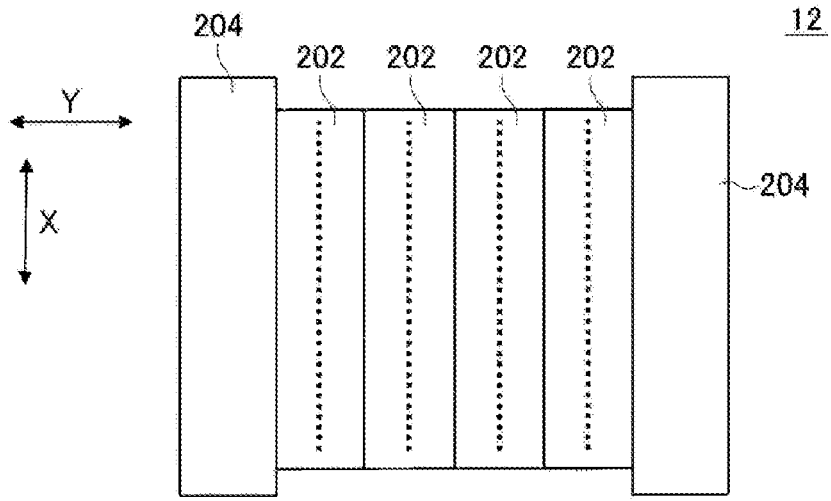
FIGS. 2A and 2B are views for explaining a head unit of the printing apparatus.
Figure 2B:
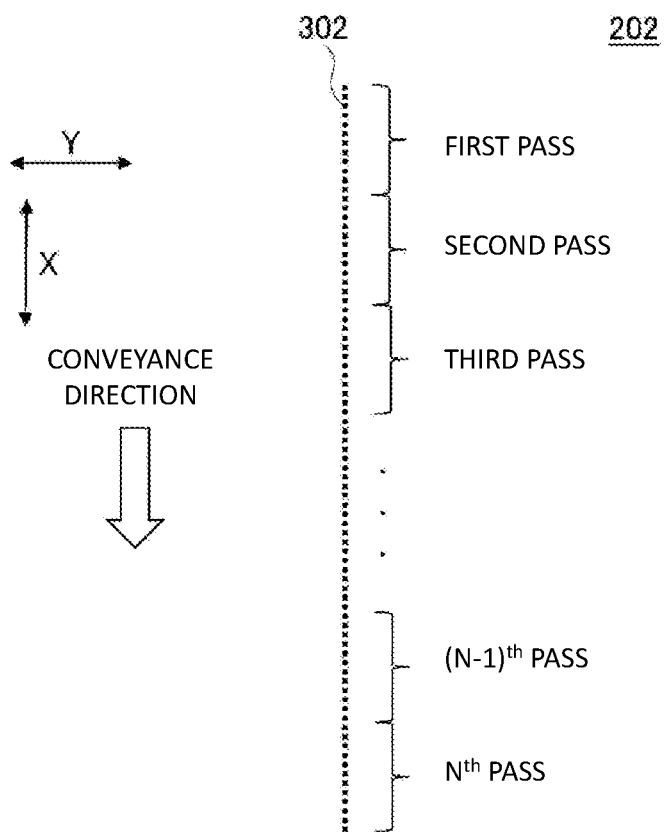

FIGS. 2A and 2B are views for explaining a head unit 12 of the printing apparatus 10, and FIG. 2A is a view illustrating an example of the overall configuration of the head unit 12, and FIG. 2B is a view illustrating an example of the nozzle row configuration of each inkjet head 202.

Also, the printing apparatus 10 according to the embodiment has a configuration identical or similar to that of a known inkjet printer, except for items to be described below.

The printing apparatus 10 is an inkjet printer for performing printing in a serial mode in which an inkjet head performs main scan operations.

The printing apparatus 10 is an inkjet printer (a UV (ultraviolet) printer) for performing printing on media 50 with ultraviolet curing ink in an inkjet mode, and includes a head unit 12, a main scan driver 14, a sub scan driver 16, a platen 18, and a controller 20.

The head unit 12 is a part for performing printing on media 50, and forms ink dots corresponding to the individual pixels of print images, in response to instructions of the controller 20.

In the present embodiment, the head unit 12 includes a plurality of inkjet heads and ultraviolet light sources, and each of inkjet heads which are included in the head unit 12 is configured to perform printing on each medium 50 in a multi-pass mode.

Here, the multi-pass mode is a printing mode in which an inkjet head performs printing by spraying ink drops onto each predetermined position on a print target medium while reciprocating over the medium, several times.

In this case, the inkjet head is configured to perform an operation of ejecting ink drops while moving in a preset main scan direction (a Y direction in the drawings) (a main scan operations), the same number of times as the number of multiple printing passes.

Also, with respect to the head unit 12, a more specific configuration, specific operations in the multi-pass mode, and the like will be described below in more detail.

The main scan driver 14 is a component for performing main scan operations of the head unit 12 (an inkjet head).

In the present embodiment, the main scan driver 14 includes a carriage 102 and a guide rail 104. The carriage 102 is a component for holding the head unit 12, and is disposed such that the nozzle rows of the inkjet heads of the head unit 12 face a medium 50.

The guide rail 104 is a rail for guiding movement of the carriage 102 in the main scan direction, such that, in response to instructions of the controller 20, the carriage 102 moves along the guide rail 104, whereby movement of the carriage 102 in the main scan direction is performed.

The sub scan driver 16 is a component for moving the medium 50 in a sub scan direction perpendicular to the main scan direction, thereby relatively moving the medium 50 and the inkjet heads of the head unit 12.

In the present embodiment, the sub scan driver 16 is a roller for conveying the medium 50, and is configured to convey the medium 50 between main scan operations, thereby relatively moving the inkjet heads and the medium 50 in the sub scan direction, thereby performing sub scan operations of the inkjet heads.

Also, for example, it is possible to move the inkjet heads in the sub scan direction, for example, by an X-Y table type apparatus in a state where the position of the medium 50 is fixed, without conveying the medium 50 in the sub scan direction. In this case, as the sub scan drive unit 16, for example, a drive unit or the like for moving the inkjet heads by moving the guide rail 104 in the sub scan direction can be used.

The platen 18 is a board-like member for mounting a medium 50, and is configured to support a medium 50 such that the medium faces the nozzle surfaces of the inkjet heads of the head unit 12 (the nozzle surfaces having the nozzles formed thereon).

Also, the controller 20 is, for example, a CPU (central processing unit) of the printing apparatus 10, and controls the operation of each unit of the printing apparatus 10, for example, in response to instructions of a host PC (host personal computer). By the above described configuration, the printing apparatus 10 performs printing on each medium 50.

Now, a more specific configuration of the head unit 12 will be described in detail. FIGS. 2A and 2B show an example of a more detailed configuration of the head unit 12. FIG. 2A is a bottom view illustrating the overall configuration of the head unit 12.

In the present embodiment, the head unit 12 includes the plurality of inkjet heads 202 for ejecting ink drops of different colors, and the plurality of ultraviolet light sources 204. Each inkjet head 202 has a nozzle row of a plurality of nozzles arranged side by side in the sub scan direction (an X direction in the drawings). Also, in the present embodiment, the plurality of inkjet heads 202 ejects ink drops of ink of individual colors, such as cyan (hereinafter, written as C), magenta (hereinafter, written as M), yellow (hereinafter, written as Y), and black (hereinafter, written as B), respectively.

Also, the plurality of inkjet heads 202 is installed side by side in the main scan direction (the Y direction) such that their positions in the sub scan direction are aligned. Therefore, during main scan operations, since each of the inkjet heads 202 passes over the same area on the medium 50, ink drops ejected from each inkjet head 202 land on the same area of the medium 50.

Also, in the present embodiment, the plurality of inkjet heads 202 is configured to reciprocate, for example, in the main scan direction, and each of movement of the inkjet heads 202 in the outward direction, and movement in the homeward direction corresponds to one main scan operation of the inkjet heads 202.

Also, an inkjet head 202 for each color may be, for example, a composite head consisting of a plurality of inkjet heads. For example, each inkjet head 202 may be a stagger head having a plurality of inkjet heads staggered. Also, in the present embodiment, each inkjet head 202 ejects ink drops of ultraviolet curing ink.

The plurality of ultraviolet light sources 204 is light sources for irradiating ink on the medium 50 with ultraviolet light.

The ultraviolet light sources 204, 204 are provided so as to be adjacent to an inkjet head 202 which is positioned at one end of the plurality of inkjet heads 202 arranged in the main scan direction (the Y direction in FIGS. 2A and 2B), and an inkjet head 202 which is positioned at the other end, respectively.

Therefore, during a main scan operation in which the inkjet heads 202 move to the right in FIGS. 2A and 2B, the ultraviolet light source 204 positioned at the left end in FIGS. 2A and 2B radiates ultraviolet light, whereby ink ejected from the individual inkjet heads 202 onto the medium 50 hardens, and during a main scan operation in which the inkjet heads 202 move to the left in FIGS. 2A and 2B, the ultraviolet light source 204 positioned at the right end in FIGS. 2A and 2B radiates ultraviolet light, whereby ink ejected from the individual inkjet heads 202 onto the medium 50 hardens.

Therefore, during each main scan operation, it is possible to appropriately harden ink dots.

Also, in a modification of the configuration of the head unit 12, it can be considered to use, for example, solvent UV ink obtained by diluting ultraviolet curing ink with a volatile organic solvent, as ink which is used in the inkjet heads 202.

Also, it can be considered to use other ink such as solvent ink or latex ink. In these cases, it is preferable to install a heater or the like inside the platen 18 (see FIGS. 1A and 1B).

Also, in a case where ultraviolet curing ink or solvent UV ink is not used, the above described ultraviolet light sources 204 may be omitted from the head unit 12.

Now, operations in the multi-pass mode will be described in more detail. The operations which are performed in the multi-pass mode in the present embodiment may be identical or similar to the operations of a known multi-pass mode, except for points to be described below.

As shown in FIG. 2B, each inkjet head 202 has a nozzle row of a plurality of nozzles 302 arranged side by side in the sub scan direction (the X direction in FIGS. 2A and 2B).

Also, in a case where an inkjet head 202 is a composite head (such as a stagger head) composed of a plurality of inkjet heads, a case where a plurality of nozzles 302 of the inkjet head 202 is arranged side by side in the sub scan direction may be, for example, a case where a plurality of nozzles 302 of each of the inkjet heads of the composite head is arranged side by side in the sub scan direction.

Also, in the present embodiment, the printing apparatus 10 (see FIGS. 1A and 1B) performs printing in the multi-pass mode in which the number of printing passes is, for example, N (N is an integer of 2 or greater).

The number N of printing passes is, for example, 4 or greater, preferably, 8 or greater. Also, in this case, for example, as shown in FIG. 2B, with respect to the nozzles 302 constituting the nozzle row of each inkjet head 202, for every predetermined number of nozzles 302, a printing pass to use the corresponding nozzles is determined in advance, like nozzles 302 for the first pass, nozzles 302 for the second pass, and nozzles 302 for the N-th pass.

More specifically, for example, in a case where the number of printing passes is N, the plurality of nozzle 302 constituting each nozzle row is divided into N-number of nozzle groups having as many nozzles 302 as one another.

Also, in the order in which the nozzle groups overlap the medium 50 in the conveyance direction of the medium 50 during a sub scan operation, with respect to each nozzle group, a printing pass to use the corresponding nozzle group is defined, like a nozzle group for the first pass and a nozzle group for the N-th pass.

Also, with respect to sub scan operations, the sub scan driver 16 (see FIGS. 1A and 1B) sets a movement distance of each sub scan operation, to a pass width which is a width of the arrangement of the nozzles 302 of each nozzle group (the width of a plurality of nozzles 302 for one printing pass in the X direction).

The pass width is the width of one of the N-number of groups of a nozzle row in the sub scan direction. Also, at each interval between main scan operations of the inkjet heads, 202, the sub scan driver 16 drives the inkjet heads 202 such that the inkjet heads performs a sub scan operation. In this way, whenever a main scan operation is performed, the sub scan driver 16 relatively moves the medium 50 with respect to the inkjet heads 202 in the sub scan direction (the X direction in the drawings), such that an area of the medium 50 facing the inkjet heads 202 shifts by the pass width.

Also, during each main scan operation, the nozzles 302 of each section of each nozzle row performs printing corresponding to a printing pass associated with the corresponding nozzles.

Also, in control on printing corresponding to each printing pass, the controller 20 (see FIGS. 1A and 1B) selects pixels for which ink drops should be ejected.

More specifically, for example, in each of the plurality of printing passes which is performed on each position of the medium 50, the controller 20 uses a mask data item which is a mask data item for designating pixels to be subjected to ink drop ejection, and controls the individual inkjet heads 202 such that the inkjet heads eject ink drops onto pixels designated by the mask data item. In this configuration, for example, it is possible to appropriately perform printing in the multi-pass mode.

Here, in a case of performing printing in the multi-pass mode, the quality of printing may depend on setting of a mask data item. Particularly, in a case of performing printing at a high resolution such as a resolution of 600 dpi or greater, since the distances between ink dots which are formed on the medium 50 are short, the influence of deviation in the landing positions of ink drops is likely to occur.

Also, as a result, the quality of printing is likely to be influenced by setting of a mask pattern. For this reason, hereinafter, setting of a mask pattern according to the present embodiment will be described in detail.

First, for convenience of explanation, with respect to setting of a mask pattern, as an example of a configuration different from the present embodiment, an example in which a mask pattern is set by a method according to the related art will be described.

For example, it is considered to use data items obtained by converting a multi-grayscale mask pattern data item which is one common data item, as mask data items for the plurality of printing passes, respectively.

In this case, the multi-grayscale mask pattern data item is, for example, a multi-grayscale data item representing the pixel values of a plurality of pixels arranged in the main scan direction and the sub scan direction, in multiple grayscales.

Also, as a mask data item which can be used for each printing pass, for example, a data item obtained by binarizing a multi-grayscale mask pattern data item with a preset threshold can be used. Also, as such a multi-grayscale mask pattern data item, more specifically, for example, data items of FIGS. 3A through 4C to be described below can be used.

Figure 3A:
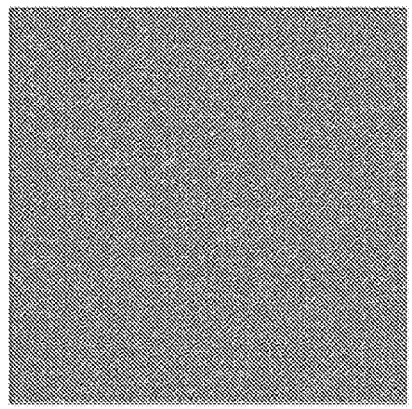
FIGS. 3A to 3C are views illustrating examples of multi-grayscale mask pattern data items.
Figure 3B:
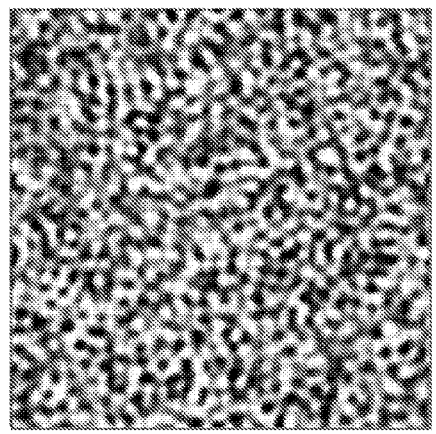
Figure 3C:
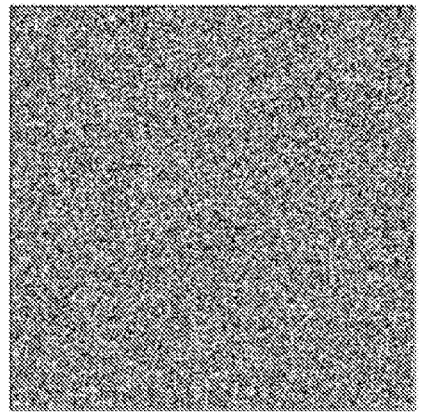
Figure 4A:
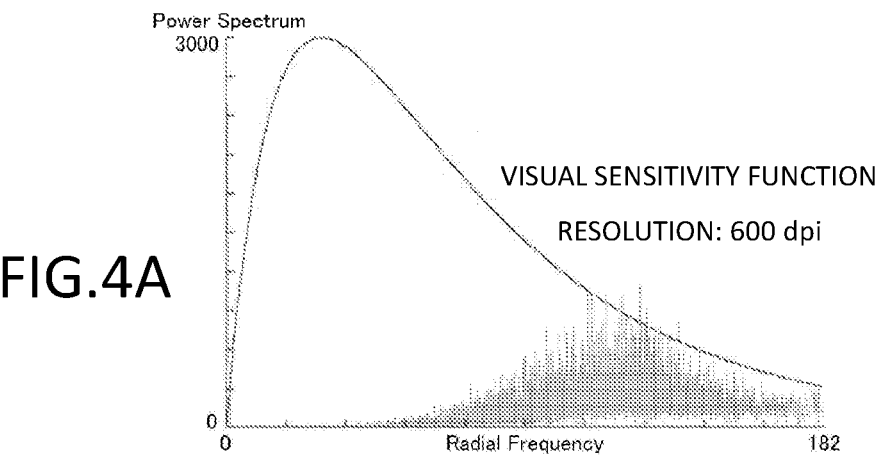
FIGS. 4A to 4C are views illustrating the spatial frequency characteristics of the multi-grayscale mask pattern data items.
Figure 4B:
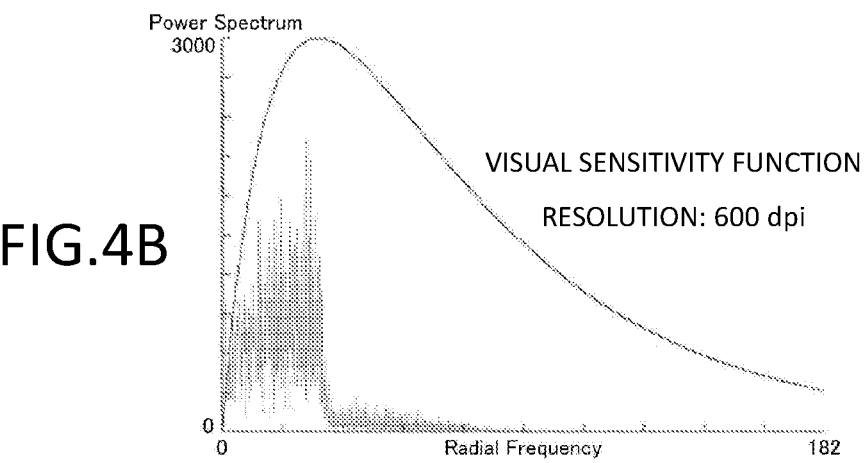
Figure 4C:
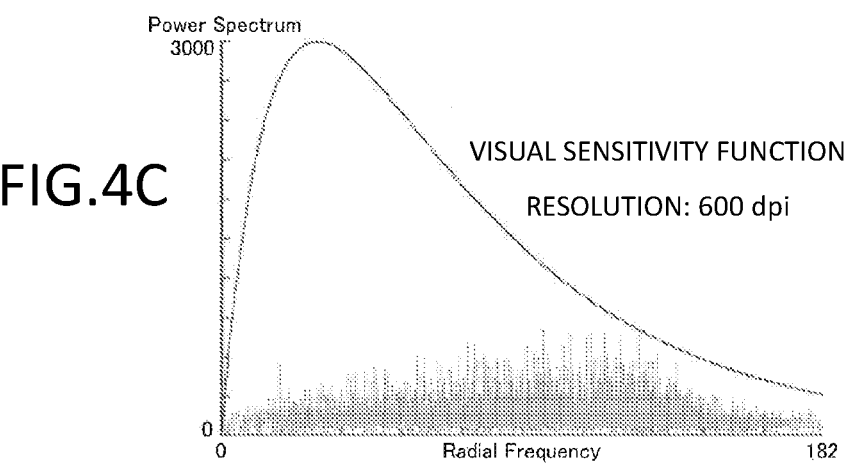

FIGS. 3A to 3C are views for explaining examples in which a multi-grayscale mask pattern data item is set by a method according to the related art, and FIG. 3A shows a high-frequency mask (high-frequency mask pattern), and FIG. 3B shows a low-frequency mask (a low-frequency mask pattern), and FIG. 3O shows a white noise mask (a white noise mask pattern). FIGS. 4A to 4C are views for explaining the spatial frequency characteristics of multi-grayscale mask pattern data items, and FIG. 4A shows a spatial frequency characteristic corresponding to the high-frequency mask (the high-frequency mask pattern) of FIG. 3A, and FIG. 4B shows a spatial frequency characteristic corresponding to the low-frequency mask (the low-frequency mask pattern) of FIG. 3B, and FIG. 4C shows a spatial frequency characteristic corresponding to the white noise mask (the white noise mask pattern) of FIG. 3C.

With respect to the high-frequency mask, FIG. 3A and FIG. 4A show examples of a multi-grayscale mask pattern data item and a spatial frequency characteristic.

The high-frequency mask is, for example, a mask having a pattern in which spatial frequencies are one-sided on the high frequency side. In this case, the spatial frequencies are, for example, the spatial frequencies of an ink dot arrangement which is formed on the media 50 by a main scan operation corresponding to one printing pass.

More specifically, a multi-grayscale mask pattern data item corresponding to the high-frequency mask is a data item having an entirely uniform pattern, for example, as shown in FIG. 3A. Also, with respect to this multi-grayscale mask pattern data item, the spatial frequency characteristic obtained by actual measurement is, for example, a characteristic shown in FIG. 4A.

Also, in a case of performing printing using the high-frequency mask in the multi-pass mode, for example, the spatial frequencies of an ink dot arrangement formed during each printing pass are one-sided on the high frequency side. Therefore, it is possible to perform printing such that the granularity is low. Also, it is possible to suppress generation of pattern stripes. However, in this case, the tolerance range for landing positions of ink drops is narrow, and in a case where landing positions are deviated, there is a problem that stripes such as alternate stripes and mask stripes are likely to be generated.

With respect to the low-frequency mask, FIG. 3B and FIG. 4B show examples of a multi-grayscale mask pattern data item and a spatial frequency characteristic. The low-frequency mask is, for example, a mask having a pattern in which spatial frequencies are one-sided on the low frequency side.

More specifically, a multi-grayscale mask pattern data item corresponding to the low-frequency mask is a data item having a pattern in which the density varies in different areas, for example, as shown in FIG. 3B. Also, with respect to this multi-grayscale mask pattern data item, the spatial frequency characteristic obtained by actual measurement is, for example, a characteristic shown in FIG. 4B.

Also, in a case of performing printing using the low-frequency mask in the multi-pass mode, for example, the spatial frequencies of an ink dot arrangement formed during each printing pass are one-sided on the low frequency side. Therefore, the tolerance range for deviation in the landing positions of ink drops is wide.

Also, as a result, even if deviation in landing positions occurs, stripes such as alternate stripes or mask stripes are unlikely to be generated. However, in this case, for example, there is a problem that pattern stripes are more likely to be generated, and the granularity is higher, as compared to a case of using the high-frequency mask.

With respect to the white noise mask, FIG. 3C and FIG. 4C show examples of a multi-grayscale mask pattern data item and a spatial frequency characteristic. The white noise mask is a mask having a pattern in which spatial frequencies are widely distributed over the entire frequency band, without being one-sided on the high frequency side or the low frequency side.

More specifically, a multi-grayscale mask pattern data item corresponding to the white noise mask is a data item having a white-noise-like pattern, for example, as shown in FIG. 3C. Also, with respect to this multi-grayscale mask pattern data item, the spatial frequency characteristic obtained by actual measurement is, for example, a characteristic shown in FIG. 4C.

Also, in a case of performing printing using the white noise mask in the multi-pass mode, for example, intermediate features between the high-frequency mask and the low-frequency mask are obtained.

Therefore, it is impossible to entirely obtain the advantages of the case of using the high-frequency mask and the advantages of the case of using the low-frequency mask, and the disadvantages (problems) of the case of using the high-frequency mask and the disadvantages (problems) of the case of using the low-frequency mask remain.

Also, as described above, in the multi-pass mode, as a mask data item (a mask) for designating pixels to be subjected to ink drop ejection during each printing pass, for example, a data item obtained by binarizing a multi-grayscale mask pattern data item with a preset threshold.

According to this configuration, for example, it is possible to appropriately derive as many mask data items as the number of passes, from one multi-grayscale mask pattern data item.

Also, in the above description, the high-frequency mask, the low-frequency mask, and the white noise mask are pattern data items obtained by binarizing the corresponding multi-grayscale mask pattern data items.

Also, in a case of deriving a mask data item from a multi-grayscale mask pattern data item, with respect to setting of various parameters such as a threshold, it is possible to perform setting according to a printing condition by a known method. In this case, the printing condition means a condition on parameters such as the print resolution, the number of passes, and the speed of main scan operations (the speed of scanning such as a high speed or a standard speed).

Also, the sizes of the multi-grayscale mask pattern data items and the patterns of the high-frequency mask, the low-frequency mask, and the white noise mask are not particularly limited, and it is possible to set arbitrary sizes. In this case, during a printing operation, for example, it is possible to perform printing over the entire medium 50 by repeatedly arranging a pattern having a predetermined size.

Also, for example, in view of a configuration for printing an image corresponding to one line during each of the plurality of printing passes, in a case of ejecting ink drops during each printing pass, a mask data item can be considered as a mask data item for determining the landing positions of ink drops. Also, for example, a multi-grayscale mask pattern data item can be considered as a data item representing an origin pattern to be used for a mask data item.

Now, examples in which mask patterns are set according to the disclosure will be described with reference to FIG. 5A to FIG. 8.

FIG. 5A to FIG. 8 are views illustrating examples of multi-grayscale mask pattern data items according to the embodiment, and their spatial frequency characteristics.

Figure 5A:
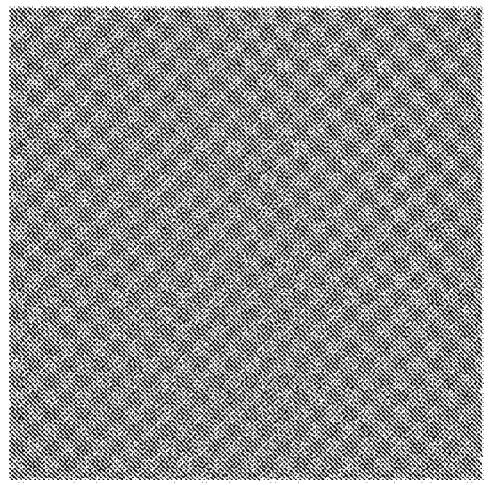
FIGS. 5A and 5B are views illustrating examples of a multi-grayscale mask pattern data item according to the embodiment, and its spatial frequency characteristic.

FIG. 5A is a view illustrating a multi-grayscale mask pattern data item having areas of a high concentration (hereinafter, referred to as high-concentration areas) and areas of a low concentration (hereinafter, referred to as low-concentration areas) arranged in a checkered pattern.

Also, in FIG. 5A, the horizontal direction is the main scan direction. Also, the vertical direction is the sub scan direction. Also, the configuration in which the high-concentration areas and the low-concentration areas are arranged in the checkered pattern is, for example, a configuration in which the high-concentration areas and the low-concentration areas have substantially the same shape and the same size, and on both sides of each high-concentration area in a predetermined first direction and on both sides of each high-concentration area in a second direction perpendicular to the first direction, low-concentration areas are disposed.

Also, in this example, the first direction is, for example, a direction intersecting with the main scan direction and the sub scan direction at 45 degrees. Also, it can be said that this configuration is a configuration in which on both sides of each low-concentration area in the first direction and on both sides of each low-concentration area in the second direction, high-concentration areas are disposed.

Figure 5B:
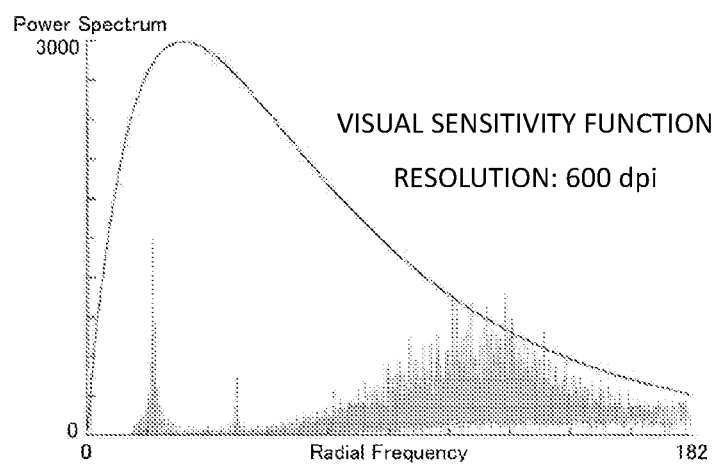

FIG. 5B shows the spatial frequency characteristic of the multi-grayscale mask pattern data item shown in FIG. 5A. This spatial frequency characteristic is a characteristic obtained by actually measuring the distribution of inter-dot distances in the pattern of the multi-grayscale mask pattern data item shown in FIG. 5A. Also, with respect to the obtained characteristic, the graph of FIG. 5B shows a histogram representing spatial frequencies having the inter-dot distances as their wavelengths, in the horizontal axis, and representing class values corresponding to the individual spatial frequencies, and frequencies corresponding to the individual class values.

As can be seen from FIG. 5B, the spatial frequency characteristic of the multi-grayscale mask pattern data item of the present embodiment is a characteristic having a wide peak on the high frequency side from the peak frequency of a visual sensitivity function (hereinafter, also referred to as the visual sensitivity peak) and having at least a narrow peak on the low frequency side from the visual sensitivity peak.

For example, it can be said that this spatial frequency characteristic is a characteristic in which spatial frequencies are one-sided on the low frequency side and the high frequency side and there are few intermediate components. Also, it can be said that the frequency band one-sided on the low frequency side is narrow and is concentrated on one point. Also, for example, this spatial frequency characteristic can also be considered as a characteristic obtained by adding the narrow peak on the low frequency side from the visual sensitivity peak to the same characteristic pattern as that of the multi-grayscale mask pattern data item for the high-frequency mask. Also, on the basis of this configuration, it can be said that the multi-grayscale mask pattern data item of the present embodiment is a pattern having the characteristic of the multi-grayscale mask pattern data item for the high-frequency mask and the characteristic of the multi-grayscale mask pattern data item for the low-frequency mask together (a hybrid mask pattern).

As described above, in the disclosure example, as the multi-grayscale mask pattern data item, a data item having a pattern different from those of the multi-grayscale mask pattern data items which are used for the high-frequency mask, the low-frequency mask, and the white noise mask is used.

Also, as a result, as a mask data item obtained by binarizing the multi-grayscale mask pattern data item, a data item having a pattern having a characteristic different from those of the high-frequency mask, the low-frequency mask, the white noise mask, and the like is used. For this reason, hereinafter, this point will be described in more detail.

As described above, in the case of performing printing in the multi-pass mode, as a mask data item for each printing pass, for example, a data item obtained by binarizing the multi-grayscale mask pattern data item with a preset threshold is used. Also, as this threshold, for example, a value preset according to the printing condition can be used. For this reason, first, results which are obtained in the case of binarizing the multi-grayscale mask pattern data item with various thresholds will be described.

FIG. 6A to FIG. 8 are views illustrating patterns which are obtained by binarizing the multi-grayscale mask pattern data item of FIG. 5A with various thresholds, and their spatial frequency characteristics.

Figure 6A:
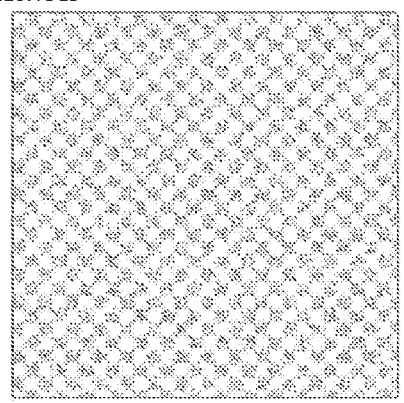
FIGS. 6A and 6B are views illustrating a pattern which is obtained by binarizing the multi-grayscale mask pattern data item according to the embodiment with a predetermined threshold, and its spatial frequency characteristic.
Figure 6A:
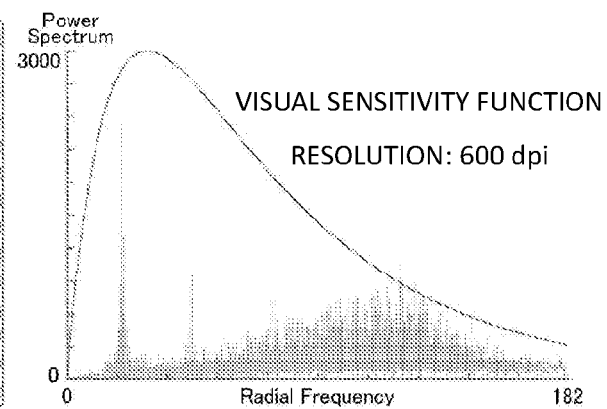
Figure 6B:
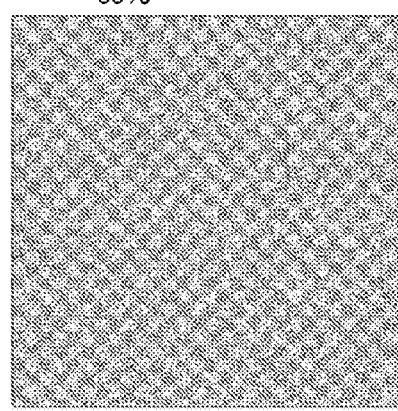
Figure 6B:
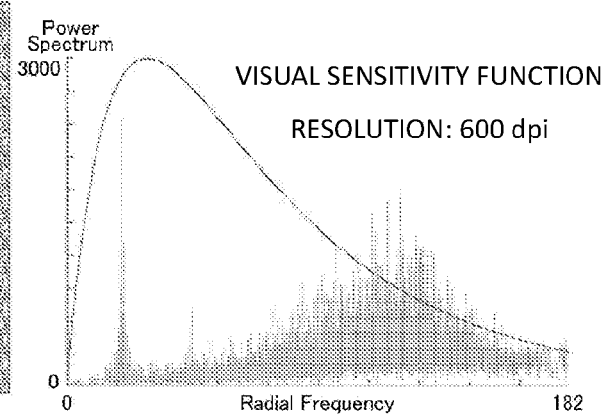
Figure 7A:
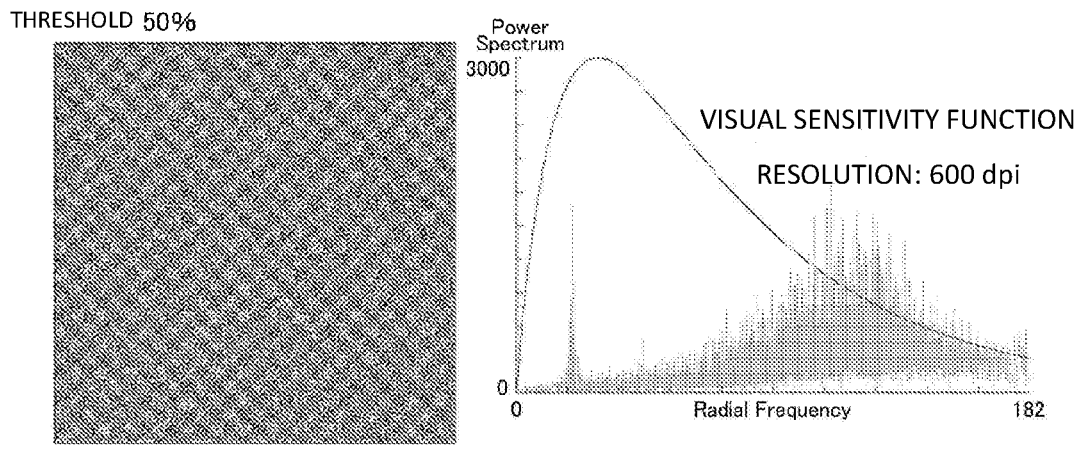
FIGS. 7A and 7B are views illustrating a pattern which is obtained by binarizing the multi-grayscale mask pattern data item according to the embodiment with another predetermined threshold, and its spatial frequency characteristic.
Figure 7B:
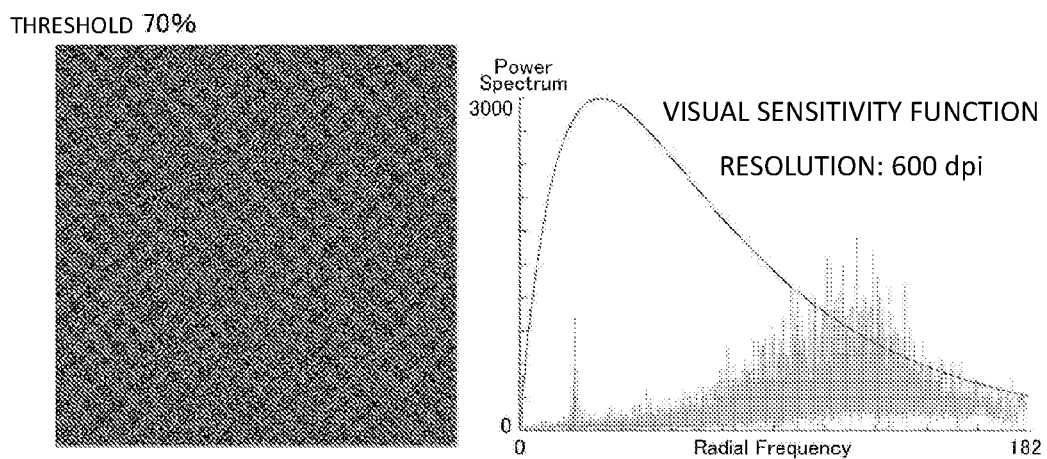
Figure 8:
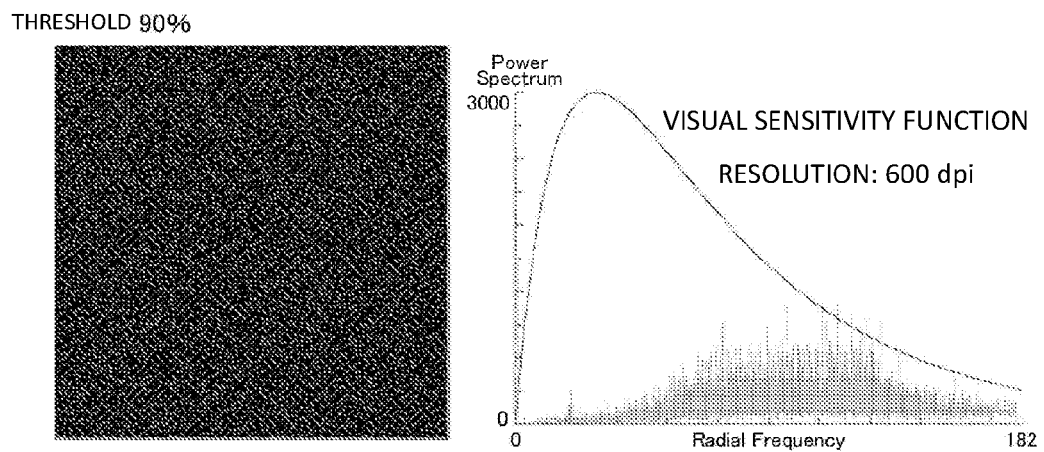
FIG. 8 is a view illustrating a pattern which is obtained by binarizing the multi-grayscale mask pattern data item according to the embodiment with a further predetermined threshold, and its spatial frequency characteristic.

Here, FIG. 6A shows a case where a threshold is 10%, and FIG. 6B shows a case where a threshold is 30%, and FIG. 7A shows a case where a threshold is 50%, and FIG. 7B shows a case where a threshold is 70%, and FIG. 8 shows a case where a threshold is 90%.

In each of FIG. 6A to FIG. 8, a pattern shown on the left side is a pattern which is obtained by binarization. For convenience of explanation, hereinafter, the patterns of each FIG. 6A to FIG. 8 will be referred to as mask data patterns corresponding to the individual thresholds. Also, each graph shown on the right side is a graph illustrating the spatial frequency characteristic of a pattern which is obtained by binarization using a corresponding threshold. Each graph is a histogram representing class values corresponding to spatial frequencies obtained by actual measurement, and frequencies corresponding to the individual class values, in association with the spatial frequencies, similarly to the graph of FIG. 5B.

As can be seen from FIG. 6A to FIG. 8, in a case of binarizing the multi-grayscale mask pattern data item of FIG. 5A with a low threshold (for example, a threshold of 50% or less, more preferably, a threshold between 10% and 30%), a pattern which is obtained by reflecting the checkered pattern of the multi-grayscale mask pattern data item composed of the high-concentration areas and the low-concentration areas is also a checkered pattern.

More specifically, in this case, the mask data pattern is a pattern in which colonies which are areas formed corresponding to the high-concentration areas of the multi-grayscale mask pattern data item and void areas which are areas formed corresponding to the low-concentration areas are arranged in a checkered pattern, for example, as shown in FIGS. 6A and 6B. Also, in this case, the print result of a printing pass using that mask pattern is also a pattern in which colonies and void areas are arranged in a checkered pattern.

In this configuration, for example, in each of the mask data pattern and the pattern of the print result, a colony is an area having a high dot density. For example, in the print result of the printing pass using the mask data item, in an area corresponding to a colony, a number of ink dots are densely formed. Therefore, it can be said that a colony is a portion where ink dots are densely distributed in a massive form. Also, a void area is an area separating a plurality of colonies. Also, in the present embodiment, in each of the mask data pattern and the pattern of the print result, a void area is an area having a dot density lower than that of the colonies, and is formed in the midst of a plurality of colonies, thereby separating the plurality of colonies. Also, in the print result of the printing pass using the mask data item, in each void area, ink dots are formed at a density lower than those of the colonies. For example, the void areas may be areas where ink dots are rarely formed.

Also, with respect to the arrangement of the colonies and the void areas, a configuration in which the colonies and the void area are arranged in a checkered pattern is, for example, a configuration in which the colonies and the void areas have substantially the same shape and the same size, and on both sides of each colony in the first direction and on both sides of each colony in the second direction, void areas are disposed. It can be said that this configuration is a configuration in which on both sides of each void area in the first direction and on both sides of each void area in the second direction, colonies are disposed. Also, for example, it is preferable that the shape of each colony should be a substantially rhombic shape. In this case, for example, it is preferable that the diagonals of the substantially rhombic shape should be parallel to the main scan direction and the sub scan direction.

Also, in the present embodiment, since the spatial frequency characteristic of the multi-grayscale mask pattern data item is the characteristic having the wide peak on the high frequency side from the visual sensitivity peak and having the narrow peak on the low frequency side from the visual sensitivity peak, it can be considered to appropriately implement a configuration having colonies and void areas arranged in a checkered pattern. More specifically, for example, by making the peak of the high frequency side wide, it is possible to appropriately distribute ink dots in the colonies. Also, as a result, it is possible to appropriately prevent problems such as generation of pattern stripes or occurrence of granularity. Also, by making the peak of the low frequency side narrow, it is possible to appropriately make the distances between colonies uniform.

Also, for example, in a case where the peak of the low frequency side is wide, it can be considered that the dispersion of the distances between colonies is large. Also, in this case, in the printed matter, for example, the colonies may be visibly noticeable, and the colonies may be unpleasant to the eye. As a result, the quality of printing may deteriorate. Also, granularity may occur. In contrast with this, in the case where the peak of the low frequency side is narrow, for example, since the colonies are arranged so as to be aligned, for example, substantially at regular intervals, it can be considered that, in the printed matter, it is difficult for the colonies to be visibly unpleasant to the eye. Also, as a result, it can be considered that, if the pattern having the colonies arranged therein is used, the quality of printing does not deteriorate.

Also, from that point of view, it is preferable that, in the spatial frequency characteristic of the multi-grayscale mask pattern data item, the position of the peak of the low frequency side should be at a certain distance from the position of the visual sensitivity peak such that a spatial frequency corresponding to the interval between colonies and the visual sensitivity peak are not too close. More specifically, for example, it is preferable to set the position of the peak of the low frequency side such that a spatial frequency which is one tenth of the peak value of the peak of the low frequency side becomes a frequency lower than the visual sensitivity peak.

Also, in the case of binarizing the multi-grayscale mask pattern data item with the low threshold, the spatial frequency characteristic becomes a characteristic reflecting more the characteristic of the low frequency side from the visual sensitivity peak in the spatial frequency characteristic of the multi-grayscale mask pattern data item. More specifically, in this case, in the characteristic, the peak positioned on the low frequency side from the visual sensitivity peak definitely remains, and the height of the peak is high. For example, it is preferable that the peak positioned on the low frequency side from the visual sensitivity peak should be a value higher than the value of the peak positioned on the high frequency side from the visual sensitivity peak, as shown in FIGS. 6A and 6B. As described above, in the present embodiment, by binarizing the multi-grayscale mask pattern data item with the low threshold, for example, it is possible to appropriately generate a mask data item having a spatial frequency characteristic in which the characteristic of the low frequency side is sufficient.

Also, in a case of binarizing the multi-grayscale mask pattern data item of FIG. 5A with a high threshold (for example, a threshold higher than 50%, more preferably, a threshold of 70% or higher, for example, a threshold between 70% and 90%), the influence of the checkered pattern of the multi-grayscale mask pattern data item is less, and a pattern which is generally more uniform and dense is obtained. Also, as a result, in the spatial frequency characteristic, the influence of the characteristic of the low frequency side of the multi-grayscale mask pattern data item is less. More specifically, in this case, for example, as shown in FIGS. 7A and 7B and FIG. 8, the value of the peak positioned on the low frequency side from the visual sensitivity peak becomes a value lower than the value of the peak positioned on the high frequency side from the visual sensitivity peak. As described above, in the present embodiment, by binarizing the multi-grayscale mask pattern data item with the high threshold, for example, it is possible to appropriately generate a mask data item having a spatial frequency characteristic in which the characteristic of the high frequency side is sufficient, like the high-frequency mask.

As described above, in the present embodiment, it is possible to generate various mask data items having different spatial frequency characteristics by binarizing the common multi-grayscale mask pattern data item with different thresholds. Also, more specifically, for example, by using a lower threshold, it is possible to a mask data item having a lower-frequency-side pattern. Also, by using a higher threshold, it is possible to generate a mask data item having a higher-frequency-side pattern. Further, in this case, as the threshold increases, the spatial frequency characteristic gradually transitions from the low frequency side toward the high frequency side.

Also, in the present embodiment, for example, on the basis of the common multi-grayscale mask pattern data item, it is possible to appropriately generate a mask pattern in which the characteristic of the low frequency side is sufficient, like the pattern having the colonies and the void areas arranged, and a mask pattern in which the characteristic of the high frequency side is sufficient, like the high-frequency mask. Therefore, with respect to each printing pass, for example, it is possible to easily and appropriately use one of the mask pattern in which the characteristic of the low frequency side is sufficient and which has a high tolerance for deviation in the landing positions of ink drops and it is difficult for strips such as alternate stripes and mask stripes to be generated, and the mask pattern in which the characteristic of the high frequency side is sufficient and which can reduce the granularity of image quality.

Also, with respect to this point, by earnest researches, the inventor of this application found that, for example, in a case of performing printing in the multi-pass mode, if a printing pass using a low-frequency mask data item in which the characteristic of the low frequency side is sufficient is performed, and then a printing pass using a high-frequency mask data item in which the characteristic of the high frequency side is sufficient is performed, it is possible to obtain advantages similar to those in a case of separately using the high-frequency mask and the low-frequency mask, and it is possible to appropriately suppress their problems.

More specifically, with respect to each position of the medium 50, for example, it can be considered to perform printing of a first printing pass using the low-frequency mask data item, and then perform printing of a second printing pass using a higher-frequency-side mask data item. In this case, for example, in a case where the spatial frequencies of the arrangement of ink dots which are formed on the medium 50 by a main scan operation corresponding to the first printing pass are referred to as first frequencies, and the spatial frequencies of the arrangement of ink dots which are formed on the medium 50 by a main scan operation corresponding to the second printing pass are referred to as second frequencies, the first frequencies become frequencies lower than the second frequencies.

In this configuration, for example, by performing printing corresponding to the first printing pass, it is possible to implement a configuration in which the characteristic of the low-frequency mask is utilized, and the tolerance for deviation in the landing positions of ink drops is great, and even if deviation in the landing positions occur, it is difficult for stripes such as alternate stripes and mask stripes to be generated. Also, by performing printing corresponding to the second printing pass, it is possible to appropriately perform printing by the configuration in which it is difficult for pattern stripes to be generated, such that granularity is less. Therefore, according to this configuration, for example, it is possible to perform printing utilizing the advantages of the high-frequency mask and the low-frequency mask. Also, as a result, with respect to the mask data items which are used in the multi-pass mode, for example, it is possible to implement a more appropriate mask data item configuration capable of higher quality printing.

Also, more specifically, as the mask data item which is used for the first printing pass, for example, a data item obtained by binarizing the multi-grayscale mask pattern data item with a threshold lower than the concentration of 30% (for example, a threshold between 10% and 30%) can be suitably used. Also, as the mask data item which is used for the second printing pass, for example, a data item obtained by binarizing the multi-grayscale mask pattern data item with a threshold higher than the concentration of 30%, and preferably, a threshold of 50% or higher, and more preferably, a threshold of 70% or higher (for example, a threshold between 70% and 90%) can be suitably used. In this configuration, for example, it is possible to more easily and appropriately generate the mask data items corresponding to the first printing pass and the second printing pass, respectively. Also, the values of the thresholds are, for example, values in a case where the lowest concentration state is defined as 0% and the highest concentration state is defined as 100%.

Also, by more earnest researches, the inventor of this application found that, in a case of performing printing in the multi-pass mode, if a mask data item having a low spatial frequency is used for a primary printing pass, it is possible to appropriately suppress the influence of deviation in the landing positions. For this reason, in the configuration described above, it is particularly preferable that the first printing pass should be a printing pass corresponding to a main scan operation which is first performed on each position of the medium 50. Also, in this case, it is preferable that the first frequency which is a spatial frequency corresponding to the first printing pass should be a frequency lower than the spatial frequency of the arrangement of ink dots which are formed on the medium 50 by a main scan operation corresponding to any one of the second and subsequent printing passes. According to this configuration, for example, it is possible to more appropriately implement a mask data configuration capable of higher quality printing.

Also, as described above, it is preferable to use a data item having a pattern having colonies and void areas arranged in a checkered pattern, as the mask data item for the first printing pass (such as a primary printing pass). In this case, by the main scan operation corresponding to the first printing pass, the inkjet heads 202 prints a pattern having a plurality of colonies and a plurality of void areas arranged in a checkered pattern on the basis of the mask data item, on the media 50. More specifically, in this case, the inkjet heads 202 forms a plurality of colony rows, each including a plurality of colonies arranged side by side in the main scan direction, on the medium 50. Also, in this case, each colony of each colony row is adjacent to a void area of a neighboring colony row of the sub scan direction, in the sub scan direction. Also, each void of each colony row is adjacent to a colony of a neighboring colony row of the sub scan direction, in the sub scan direction. Therefore, the spatial frequency characteristic of the pattern which is printed by the first printing pass becomes a characteristic having at least one peak in a frequency band lower than the peak frequency of the visual sensitivity function, for example, as described in association with the spatial frequency characteristic of the low-frequency-side mask data item.

Now, the arrangement of ink dots which are formed on the medium 50 by the main scan operation corresponding to the first printing pass will be described in more detail. In the present embodiment, as described above, as the mask data items for the individual printing passes, the data items obtained by binarizing the multi-grayscale mask pattern data item with the preset thresholds are used. Also, in this case, for example, a spatial frequency characteristic related to the arrangement of ink dots which are formed during each printing pass such as the first printing pass (hereinafter, referred to as a spatial frequency characteristic corresponding to a printing pass) becomes the same as the spatial frequency characteristic of the pattern of a mask data item which is used for the corresponding printing pass. Also, as a result, for example, the spatial frequency characteristics corresponding to the individual printing passes become characteristics which are represented similarly to the graphs shown the right sides of FIG. 6A to FIG. 8.

Also, in view of ink dots which are formed on the medium 50 during each printing pass, for example, it can be said that a spatial frequency characteristic corresponding to each printing pass is a spatial frequency characteristic representing the distribution of inter-dot distances which are the distances between neighboring dots in the arrangement of ink dots formed on the medium 50 by the main scan operation of the corresponding printing pass. For example, this spatial frequency characteristic can be calculated by actual measurement. In this actual measurement, for example, it is possible to actually a main scan operation, thereby forming ink dots on the medium 50, and measure the inter-dot distances.

Also, in the arrangement of ink dots which are formed on the medium 50 by the main scan operation of the first printing pass, the ink dots of each colony are arranged, for example, such that the inter-dot distances are higher than a spatial frequency corresponding to the visual sensitivity peak. In this case, for example, it is preferable that the lengths of each colony in the main scan direction and the sub scan direction should be longer than a wavelength corresponding to the visual sensitivity peak. Also, it is preferable that the lengths of each void area in the main scan direction and the sub scan direction should be longer than the wavelength corresponding to the visual sensitivity peak.

Also, a state where the ink dots of each colony are arranged such that the inter-dot distances are higher than the spatial frequency corresponding to the visual sensitivity peak is a state where substantially all dots of the colony are arranged such that the spatial frequencies corresponding to the inter-dot distances are higher than the spatial frequency corresponding to the visual sensitivity peak. In this case, for example, according to quality required for printing, subsequently all dots of the colony may be all dots except for some dots. Also, some exceptive dots mean some dots which do not influence the visibility of the printed matter, for example, some dots included in an allowable error range according to the accuracy of printing.

Also, with respect to the spatial frequencies corresponding to the first printing pass, for example, in view of the distribution of the inter-dot distances, it is preferable that 60% or greater of all inter-dot distances should be inter-dot distances corresponding to spatial frequencies higher than the peak frequency of the visual sensitivity function. Also, with respect to the inter-dot distance distribution, more specifically, for example, with respect to the spatial frequency characteristic illustrating the inter-dot distance distribution of the arrangement of ink dots which are formed on the medium 50 by the main scan operation of the first printing pass, in a case of representing the spatial frequency characteristic by a continuous curve, it is preferable that the waveform of the curve representing the spatial frequency characteristic has a high-frequency-side peak which is a peak existing in a frequency band higher than the peak frequency of the visual sensitivity function, and a low-frequency-side peak which is a peak existing in a frequency band lower than the peak frequency of the visual sensitivity function. Also, in this waveform, it is preferable that the peak width of the low-frequency peak is narrower than the peak width of the high-frequency peak. According to this configuration, for example, it is possible to appropriately set the spatial frequencies corresponding to the first printing pass, on the low frequency side.

Also, the case of representing the spatial frequency characteristic representing the inter-dot distance distribution by a continuous curve means, for example, a case of generating a histogram representing class values corresponding to the spatial frequencies, and frequencies corresponding to the class values, by actual measurement, and representing the relation between the class values and the frequencies by a continuous curve. Also, this continuous curve may be, for example, a curve appropriately smoothed in view of dispersion and the like of actual measurement. Also, the width of each of the high-frequency-side peak and the low-frequency-side peak may be, for example, the half bandwidth (full width at half maximum) of the corresponding peak. Also, for example, it is preferable that the peak width of the low-frequency peak should be equal to or less than one tenth of the peak width of the high-frequency peak. Also, with respect to the values of the peaks, for example, it is preferable that the peak value of the low-frequency peak should be greater than the peak value of the high-frequency peak. According to this configuration, for example, it is possible to arrange the colonies more orderly. Also, as a result, for example, it is possible to appropriately prevent an image from being generated as a noise on the print material due to the arrangement of the colonies.

In the above described configuration, for example, by setting the spatial frequency characteristic corresponding to the first printing pass which is a printing pass is first performed, on the low frequency side, it is possible to appropriately suppress the influence of deviation in the landing positions and the like. Therefore, for example, it is possible to appropriately prevent strips such as alternate stripes and mask stripes from being generated due to deviation in the landing positions. Also, by setting the spatial frequency characteristic corresponding to the second printing pass which is performed later than the first printing pass, on the high frequency side, it is possible to appropriately perform printing by the configuration in which it is difficult for pattern stripes to be generated, such that granularity is less. Therefore, according to the present embodiment, for example, even in a case where the resolution of printing is high, it is possible to more appropriately perform high-quality printing.

Figure 9A:
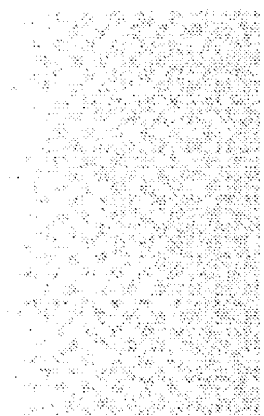
FIGS. 9A to 9C are views illustrating print results of individual printing passes of the multi-pass mode.
Figure 9B:
Figure 9C:
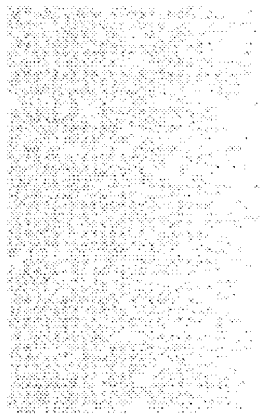

Now, printing which is performed in the multi-pass mode according to the present embodiment will be described in more detail. FIGS. 9A to 9C show print results of individual printing passes of the multi-pass mode. Each print result shows the arrangement of ink dots formed by landing of ink drops in a case of performing one main scan operation using a mask data item obtained by binarizing the multi-grayscale mask pattern data item of FIGS. 5A and 5B.

Also, this printing was performed with a JEX 500 type inkjet printer made by MIMAKI ENGINEERING CO., LTD. in a state where the number of printing passes was set to 8 (8 passes) and high-speed scan was set. Also, the resolution of printing was 600-by-600 dpi. Also, in FIGS. 9A to 9C, in the upward and downward direction corresponds to the main scan direction, and the left-right direction corresponds to the sub scan direction.

FIG. 9A shows a print result of an area corresponding to the primary printing pass. This printing pass is an example of the first printing pass. In the case shown in FIGS. 9A to 9C, with respect to the primary printing pass, a mask data item obtained by binarizing of the multi-grayscale mask pattern data item with a low threshold equal to or lower than 30% was used. Therefore, the spatial frequency characteristic of the arrangement of ink dots formed during the primary printing pass becomes a characteristic one-sided on the low frequency side, for example, like the mask data item shown in FIGS. 6A and 6B. Also, more specifically, in the arrangement of ink dots formed during the primary printing pass, as shown in FIGS. 9A to 9C, the difference between the colonies and the void areas is clear, and the colonies are arranged at regular intervals. Also, as a result, even if deviation in the landing positions of ink drops is reported, at a specific frequency, a peak does not occur.

Also, in this case, since there are the void areas between the colonies, for example, between image connection between two consecutive printing passes which are performed with a sub scan operation interposed therebetween, and image connection in one printing pass, it is difficult for a difference to occur. Therefore, according to this configuration, for example, it is possible to uniformly perform image connection between printing passes, such that images are smoothly connected. Also, as a result, for example, it is possible to make generation of stripes such as alternate stripes and mask stripes more difficult. Also, it is considered that it is easy to obtain a coating effect in the subsequent printing passes.

FIG. 9B shows the print result of an area corresponding to the second to seventh printing passes. FIG. 9C shows the print result of an area corresponding to the eighth printing pass which is the final printing passes. Each of the second to eighth printing passes is an example of the second printing pass. Also, in the case shown in FIGS. 9A to 9C, with respect to the second to eighth printing passes, a mask data item obtained by binarizing the multi-grayscale mask pattern data item with a high threshold greater than 30% was used. Therefore, the spatial frequency characteristics of the arrangements of ink dots formed in those printing passes become characteristics one-sided on the high frequency side as compared to the primary printing pass, for example, like cases of using mask data items shown in FIG. 7B and FIG. 8. Also, as a result, for example, similarly to the case of using the high-frequency mask, it is possible to appropriately disperse ink dots, and appropriately reduce the granularity of image quality. Further, since ink dots was formed in the primary printing pass performed previously such that the spatial frequency characteristic was one-sided on the low frequency side, it is difficult for stripes such as alternate stripes and mask stripes to be generated.

As described above, in the present embodiment, the arrangements of dots which are formed in some printing passes (for example, the primary printing pass) have characteristics one-sided on the low frequency side, and the arrangements of dots which are formed in the subsequent printing passes (for example, the second to final printing passes) have characteristics one-sided on the high frequency side. In this configuration, for example, since a pattern data item having a high tolerance for deviation in the landing positions of ink drops is used in the early printing pass of printing, even if a pattern data item having a low tolerance for deviation in the landing positions of ink drops is used in the subsequent printing passes, it is difficult for stripes and the like to be generated due to the pattern. Also, since a high-frequency-side pattern data item is used in the second half of printing, it is possible to appropriately reduce granularity. Therefore, according to this configuration, for example, as described above, it is possible to appropriately perform printing by the configuration in which it is difficult for pattern stripes to be generated, such that granularity is less. Also, it is possible to implement a configuration in which the tolerance for deviation in the landing positions of ink drops is great, and even if deviation in the landing positions occur, it is difficult for stripes such as alternate stripes and mask stripes to be generated. Therefore, according to the present embodiment, for example, in a case of performing printing in the multi-pass mode, it is possible to appropriately higher-quality printing.

Also, in the case shown in FIGS. 9A to 9C, for convenience of experiments, in addition to setting of the spatial frequency characteristics as described above, setting was performed such that the printing concentration varies at a gradient depending on the positions of the nozzles of the nozzle rows. Therefore, for example, in the print results of the primary and final printing passes, the printing concentration varies depending on the positions in the sub scan direction. However, even in a case where the concentration does not vary at a gradient, similarly, the effects of the present embodiment described above can be obtained.

Until now, the configuration in the case of generating data items as mask data items for the individual printing passes from one common multi-grayscale mask pattern data item has been described. However, in a modification of the configuration of the printing apparatus 10, in addition to the configuration for generating mask data items of all printing passes from one multi-grayscale mask pattern data item, a configuration using a plurality of multi-grayscale mask pattern data items can be considered. Also, in addition to the configuration for generating mask data items by binarizing the multi-grayscale mask pattern data item, a configuration which prepares a plurality of mask data items having different spatial frequency characteristics in advance can be considered. Even in these cases, for example, if the arrangement of dots which are formed in the first printing pass which is performed previously has a characteristic one-sided on the low frequency side, and the arrangement of dots which are formed in the second printing pass which is subsequently performed has a characteristic one-sided on the high frequency side, it is possible to obtain the same effects as those described above.

Although the disclosure has been described above by way of the embodiment, the technical scope of the disclosure is not limited to the scope described in the embodiment. It is apparent to those skilled in the art that it is possible to make various changes or modifications in the above described embodiment. It is apparent from a description of claims that forms obtained by making such changes or modifications can also be included in the technical scope of the disclosure.

As described above, according to the embodiment, the printing apparatus 10 for performing printing on a medium 50 in the inkjet mode includes:

the inkjet head 12 for ejecting ink drops toward the medium 50;

the main scan driver 14 for driving the ink head 12 to perform main scan operations in the main scan direction (the Y direction in FIGS. 1A and 1B);

the sub scan driver 16 for relatively moving the medium 50 and the ink head 12 in the sub scan direction (the X direction in FIGS. 1A and 1B) perpendicular to the main scan direction; and the controller 20 for controlling ejection of ink drops from the ink head 12, and driving of the main scan driver 14 and the sub scan driver 16, wherein the controller 20 repeats a predetermined number of printing passes of ejecting ink drops from the ink head 12 while moving the ink head 12 in the main scan direction, whereby printing is performed on each position of the medium 50, and the controller 20 controls ink drop ejection on the basis of mask data items for designating pixels to be subjected to ink drop ejection, such that spatial frequencies of the arrangement of ink dots which are formed on the medium 50 during the first printing pass are lower than spatial frequencies of the arrangement of ink dots which are formed on the medium 50 during the second printing pass later than the first printing pass.

In this configuration, in the arrangement of ink dots which are formed on the medium 50 during the first printing pass, the spatial frequencies of the arrangement of ink dots are positioned on the low frequency side as compared to those of the second printing pass. Therefore, the tolerance range for deviation in the landing positions of ink drops is wide.

As a result, even if deviation in landing positions occurs, stripes such as alternate stripes or mask stripes are unlikely to be generated.

In the arrangement of ink dots which are formed on the medium 50 during the second printing pass later than the first printing pass, the spatial frequencies of the arrangement of ink dots are positioned on the high frequency side. Therefore, it is possible to perform printing such that granularity is less, and generation of pattern stripes is suppressed.

In this way, it is possible to obtain a printed matter having the advantages of both of the case where the spatial frequencies of the arrangement of ink dots are low and the case where the spatial frequencies of the arrangement of ink dots are high. Therefore, it is possible to more appropriately perform higher-quality printing.

INDUSTRIAL APPLICABILITY

The disclosure can be suitably used, for example, in printing devices.

The invention claimed is:

1. A printing apparatus for performing printing in an inkjet method, comprising:
an inkjet head for ejecting ink drops toward a medium;
a main scan driver for driving the inkjet head to perform main scan operations in a main scan direction;
a sub scan driver for relatively moving the inkjet head and the medium in a sub scan direction perpendicular to the main scan direction; and
a controller for controlling ejection of ink drops from the inkjet head, and driving of the main scan driver and the sub scan driver,
wherein the controller repeats a predetermined number of printing passes of ejecting ink drops from the inkjet head while moving the inkjet head in the main scan direction, whereby printing is performed on the medium, and
the controller controls ink drop ejection on a basis of mask data items for designating pixels to be subjected to ink drop ejection, such that spatial frequencies of an arrangement of ink dots which are formed on the medium during a first printing pass are lower than spatial frequencies of an arrangement of ink dots which are formed on the medium during a second printing pass later than the first printing pass.

2. The printing apparatus according to claim 1, wherein:
the first printing pass is a printing pass corresponding to a main scan operation which is first performed on each position of the medium, and
the second printing pass is a printing pass corresponding to one main scan operation of second and subsequent main scan operations.

3. The printing apparatus according to claim 2, wherein:
the controller uses data items obtained by converting a multi-grayscale mask pattern data item which is one common data item, as the mask data items for the first printing pass and the second printing pass, respectively,
the multi-grayscale mask pattern data item is a multi-grayscale data item representing pixel values of a plurality of pixels arranged in the main scan direction and the sub scan direction, in multiple grayscales,
the mask data item for the first printing pass is a data item obtained by binarizing the multi-grayscale mask pattern data item with a preset first threshold, and
the mask data item for the second printing pass is a data item obtained by binarizing the multi-grayscale mask pattern data item with a second threshold corresponding to a concentration higher than that of the first threshold.

4. The printing apparatus according to claim 1, wherein:
the controller uses data items obtained by converting a multi-grayscale mask pattern data item which is one common data item, as the mask data items for the first printing pass and the second printing pass, respectively,
the multi-grayscale mask pattern data item is a multi-grayscale data item representing pixel values of a plurality of pixels arranged in the main scan direction and the sub scan direction, in multiple grayscales,
the mask data item for the first printing pass is a data item obtained by binarizing the multi-grayscale mask pattern data item with a preset first threshold, and
the mask data item for the second printing pass is a data item obtained by binarizing the multi-grayscale mask pattern data item with a second threshold corresponding to a concentration higher than that of the first threshold.

5. The printing apparatus according to claim 4, wherein:
by the main scan operation of the first printing pass, the inkjet head forms ink dots on the medium in a pattern including a plurality of colonies and a plurality of void areas, each colony being an area having a plurality of ink dots densely formed, and each void area separating a plurality of colonies and having ink dots formed at least at a density lower than those of the colonies;
by the ink dots, the colonies and the void areas are disposed such that, on both sides of each colony in a first direction, and on both sides of each colony in a second direction perpendicular to the first direction, void areas are positioned, and
in a spatial frequency characteristic representing a distribution of inter-dot distances which are distances between neighboring dots in the arrangement of ink dots formed on the medium during the first printing pass, 60% or greater of all inter-dot distances correspond to spatial frequencies higher than a peak frequency of a visual sensitivity function, and in a frequency band lower than the peak frequency of the visual sensitivity function, at least one peak is included.

6. The printing apparatus according to claim 5, wherein:
in the arrangement of ink dots which are formed on the medium by the main scan operation of the first printing pass,
the ink dots in each colony are arranged such that spatial frequencies corresponding to the inter-dot distances are higher than the peak frequency of the visual sensitivity function, and
lengths of each void area in the main scan direction and the sub scan direction are longer than a wavelength corresponding to the peak frequency of the visual sensitivity function.

7. The printing apparatus according to claim 6, wherein:
by the main scan operation of the first printing pass, the inkjet head forms a plurality of colony rows on the medium, each colony including a plurality of colonies arranged side by side in the main scan direction,
each colony of each colony row is adjacent to a void area of a neighboring colony row of the sub scan direction, in the sub scan direction, and
each void area of each colony row is adjacent to a colony of a neighboring colony row of the sub scan direction, in the sub scan direction.

8. The printing apparatus according to claim 7, wherein:
in a case of representing a spatial frequency characteristic representing the inter-dot distance distribution of the arrangement of ink dots formed on the medium by the main scan operation of the first printing pass, by a continuous curve,
a waveform of the continuous curve representing the spatial frequency characteristic is a waveform having the followings:
a high-frequency-side peak which is a peak existing in a frequency band higher than the peak frequency of the visual sensitivity function; and
a low-frequency-side peak which is a peak existing in a frequency band lower than the peak frequency of the visual sensitivity function, and
in the waveform, a peak width of the low-frequency-side peak is narrower than a peak width of the high-frequency-side peak.

9. The printing apparatus according to claim 8, wherein: the printing apparatus performs printing in a multi-pass mode at a resolution of 600 dpi or greater.

10. A printing method of performing printing in an inkjet method using a printing apparatus including an inkjet head for ejecting ink drops toward a medium,
a main scan driver for driving the inkjet head to perform main scan operations in a main scan direction,
a sub scan driver for relatively moving the inkjet head and the medium in a sub scan direction perpendicular to the main scan direction, and
a controller for controlling ejection of ink drops from the inkjet head, and driving of the main scan driver and the sub scan driver, the method comprising:
a step of allowing the controller to repeat a predetermined number of printing passes of ejecting ink drops from the inkjet head while moving the inkjet head in the main scan direction, thereby performing printing on each position of the medium,
wherein the controller controls ink drop ejection on a basis of mask data items for designating pixels to be subjected to ink drop ejection, such that spatial frequencies of an arrangement of ink dots which are formed on the medium during a first printing pass are lower than spatial frequencies of an arrangement of ink dots which are formed on the medium during a second pass later than the first printing pass.

* * * * *